(12) United States Patent
Wägner et al.

(10) Patent No.: US 10,264,730 B2
(45) Date of Patent: Apr. 23, 2019

(54) AGRICULTURAL TOOL CONTROL SYSTEM

(71) Applicants: AGCO Feucht GmbH, Hesston, KS (US); AGCO Corporation, Hesston, KS (US)

(72) Inventors: Christian Wägner, Feucht (DE); Lorenz Riegger, Hesston, KS (US)

(73) Assignees: AGCO Feucht GmbH, Feucht (DE); AGCO Corporation, Duluth, GA (US)

( * ) Notice: Subject to any disclaimer, the term of this patent is extended or adjusted under 35 U.S.C. 154(b) by 0 days.

(21) Appl. No.: 15/617,434

(22) Filed: Jun. 8, 2017

(65) Prior Publication Data
US 2017/0359959 A1   Dec. 21, 2017

(30) Foreign Application Priority Data

Jun. 21, 2016 (GB) .................................. 1610834.2

(51) Int. Cl.
*A01D 78/10* (2006.01)
(52) U.S. Cl.
CPC .................. *A01D 78/1085* (2013.01)
(58) Field of Classification Search
CPC .............. A01D 78/1042; A01D 78/105; A01D 78/125; A01D 78/1014; A01D 78/1007; A01D 78/1078; A01D 78/1071; A01D 78/1028; A01D 78/10; A01D 78/007; A01D 78/1085; A01D 80/00
USPC ......... 56/192, 370, 377, 367, 375, 365, 372; 172/311; 280/494
See application file for complete search history.

(56) References Cited

U.S. PATENT DOCUMENTS

| 4,914,901 | A |   | 4/1990 | Aron    |              |
|-----------|---|---|--------|---------|--------------|
| 5,377,482 | A | * | 1/1995 | Knigge  | A01D 78/1007 |
|           |   |   |        |         | 56/367       |
| 5,918,451 | A | * | 7/1999 | Vonesch | A01D 78/1007 |
|           |   |   |        |         | 56/365       |
| 6,050,076 | A | * | 4/2000 | Aron    | A01D 78/1085 |
|           |   |   |        |         | 56/366       |

(Continued)

FOREIGN PATENT DOCUMENTS

| DE | 3029502 A1    | 3/1982 |
|----|---------------|--------|
| DE | 102014018133 A1 | 6/2016 |

(Continued)

OTHER PUBLICATIONS

UK Intellectual Property Office, International Search Report for priority UK Application No. GB1610834.2, dated Dec. 22, 2016.

(Continued)

*Primary Examiner* — Robert E Pezzuto

(57) ABSTRACT

An agricultural tool including an elongated frame, ground engaging wheels for supporting the frame, and at least two rotors carried by a respective arm. Each respective arm is moveable into a working position in which the rotors are carried on opposing sides of the frame at a distance away from the frame. Each rotor includes a hub provided with tines and each hub is supported above the ground by at least one support wheel. The tool further includes a control system which detects when the tool is moving around a bend and identifies which of the rotors is an inner rotor moving on the inside of the bend and raises the inner rotor to compensate for the downward force exerted on the inner rotor during the turn.

8 Claims, 2 Drawing Sheets

(56) References Cited

U.S. PATENT DOCUMENTS 6,467,249 B2* 10/2002 Demanet ............ A01D 78/1078
56/367
8,578,690 B2 11/2013 Horner
9,198,356 B2* 12/2015 Hoerner ............. A01D 78/1014

FOREIGN PATENT DOCUMENTS

| EP | 0455022 A1 | 11/1991 |
| EP | 0463323 A1 | 1/1992 |
| GB | 1285439 A | 8/1972 |
| WO | 2015/091058 A1 | 6/2015 |

OTHER PUBLICATIONS

European Patent Office, International Search Report for related Application No. EP17 17 4765, dated Nov. 21, 2017.

* cited by examiner

AGRICULTURAL TOOL CONTROL SYSTEM

BACKGROUND OF THE INVENTION

Field of Invention

The invention relates to agricultural hay tools having two or more rotors which rotate about respective vertical axes and support a plurality of tines. More specifically, the invention relates to agricultural rakes and tedders having two or more rotors.

Description of Related Art

Agricultural rakes generally comprise a frame, ground engaging wheels for supporting the frame on the ground, and at least one rotor which is driven in rotation about a vertical rotor axis. In use, the frame is attached to the rear of an agricultural tractor by means of a drawbar and towing hitch for example. A torque is transferred from a power take-off (PTO) stub on the tractor to the rotors by a drive train. The frame comprises an elongated member which extends longitudinally and centrally behind the tractor to which it is attached. The frame supports two or more arms which each carry a rotor. The arms are moveable to extend laterally from the frame.

Each rotor comprises a hub and a plurality of tine arms extending radially from the hub. Crop engaging tines are attached to the radially outermost ends of the arms for raking or windrowing cut forage material lying on the ground. To engage and release the crop material, the tines are respectively lowered and raised at predetermined positions around the rotary circumferential path. To effect this lowering and raising the innermost end of each tine arm is slideably engaged in a cam track. As the rotor rotates rollers on the arms move along the circular cam track which serves to twists the tine arms on their respective axes, thus raising and lowering the tines. Such an arrangement is present on rakes marketed by the applicant today under the brand "Fella", including model TS14055.

The working height of a rotor above ground is maintained by a rotor running gear comprised of one or more support wheels mounted below the hub. The support wheels protrude below the lowest position of tine to prevent the tines from striking the ground, which could otherwise result in damage to the tines and/or soil contamination of the forage material. The optimum working height may vary depending on factors such as the type of forage material and underlying terrain, and it is known to provide a height adjustment mechanism to extend or retract the support wheels relative to the hub. Such a mechanism may comprise a simple manually operated mechanical lever, or a more complex electrical or hydraulic actuator arrangement that may be adjusted from the tractor cab.

Problems exist when the rake is towed along a curve, or a bend, for example when making a headland turn at the end of a field. When being towed along a curve, or a bend the inside rotor of the rake experiences an increased downwards force causing it to be pushed downwards closer to the ground. This downwards force can cause an unburdening effect on the outer rotor causing the outer rotor to lift.

This results in uneven raking whilst travelling around the curve, bend resulting in an untidy swathe. In turn this can lead to a loss of crop for a farmer when a baler is later used to bale the crop from the swathe since some of the hay which is not in the swathe will not be picked up by the baler. In addition, since the inner rotor is moved closer to the earth, the tines come into contact with the earth and can therefore distribute earth and stones and manure into the raked swathe which can then enter the animal fodder food chain. Further, if in contact with the ground, the tines can rip the grass, or crop plant being raked requiring it to be re sown or re planted.

OVERVIEW OF THE INVENTION

It is an aim of the present invention to control the height of the inner rotor on a rake as the rake is towed around a curve or a bend. It is further aim of the invention to also control the height of the outer rotor as the rake is towed around a curve, or bend.

According to the invention there is provided an agricultural tool comprising an elongated frame, ground engaging wheels for supporting the frame on the ground and at least two rotors carried by a respective arm, each respective arm moveable into a working position in which the rotors are carried on opposing sides of the frame at a distance away from the frame, each of said rotors comprising a hub provided with tines and each of said hubs supported above the ground by at least one support wheel, wherein the tool further comprises a control system which detects when the tool is moving around a bend and identifies which of the rotors is an inner rotor moving on the inside of the bend and in response raises the inner rotor to compensate for the downwards force exerted on the inner rotor during the turn.

In this way, the inner rotor and its tines are maintained above the ground so that the tines do not come into contact with the ground. This allows the tines to continue to work the crop evenly as the tool travels around a bend, such as when making a turn.

Preferably, the control system identifies an outer rotor when the tool is turning around a bend and in response lowers the outer rotor.

This counteracts the lift which may be experienced by the outer rotor as it moves around the bend allowing the tines on the outer rotor to continue work the crop evenly.

Preferably, a height adjustment means between the hub and the support wheel varies the height of a rotor with respect to the wheels.

Alternatively, or additionally, to the height adjustment means between the hub and the support wheel, the arm of the tool may be used to vary the height of a rotor with respect to the ground.

Preferably, the tool comprises a sensor which detects when the tool is turning.

More preferably, the sensor comprises Global Positioning System (GPS).

Preferably, the agricultural is attachable to a tractor for towing said control system receives a signal from the towing tractor that a turn is being made.

The agricultural tool may be a rake or a tedder.

BRIEF DESCRIPTION OF THE DRAWINGS

The invention will now be described, by way of example only, with reference to the accompanying drawings in which.

DETAILED DESCRIPTION OF THE INVENTION

Figure 1:
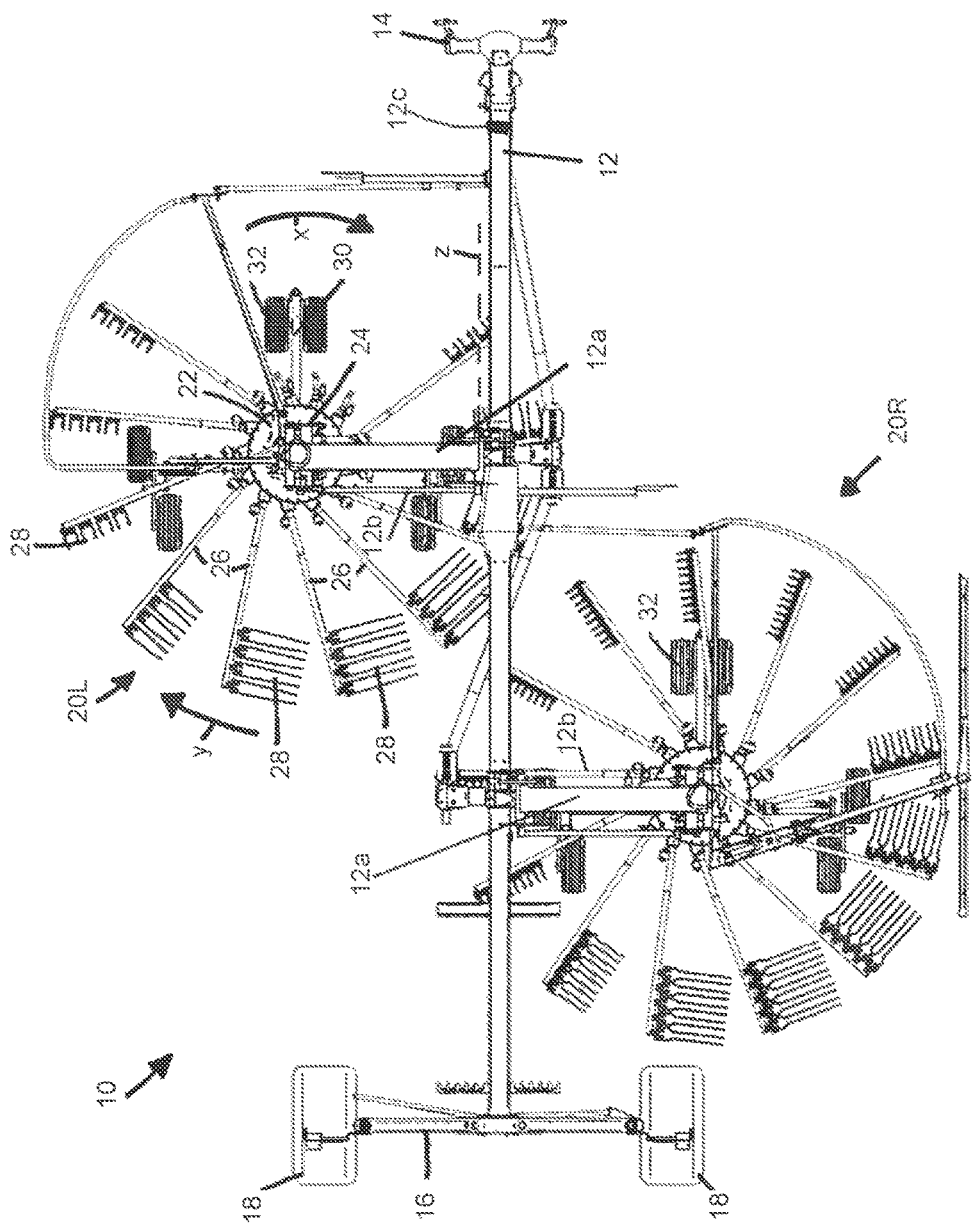
FIG. 1 shows a twin rotor rake in accordance with the invention.

FIG. 1 is a view from above of an agricultural rake, although it must be appreciated that the invention is equally applicable to other agricultural tools in particular hay tools, such as tedders.

With reference to FIG. 1, a twin rotor rake 10 comprises an elongated frame 12 running from front to rear. At the front end of frame 12 a mounting linkage 14 is provided for hitching the rake 10 to the lower links of a tractor three point linkage (not shown). At the rear end an axle 16 with steerable wheels 18 is pivotally attached to the frame 12.

The rake 10 comprises two rotors 20L, 20R supported on two respective arms 12a which are attached to opposing sides of frame 12 and extend the rotors 20L, 20R a lateral distance away from frame 12. Arms 12a can be raised and lowered about a pivot point on frame 12 by hydraulic cylinders 12b. In FIG. 1 the arms 12a are lowered in a working position ready to rake grass, or other crop. When the rake 10 is not in use for raking, arms 12a are raised upwards into an almost vertical position which lifts rotors 20L, 20R into a transport position which reduces the overall width of the tool and facilitates transport along roads. The arms 12a may be pivoted into any position between the working and transport position.

The rotors are designated generally 20L (left-hand rotor) and 20R (right-hand rotor) and are offset in a fore and aft direction, each define a raking circle that overlaps the longitudinal part of frame. An alternative configuration for a twin rotor rake is where the two rotors are not offset in a fore and aft direction, but instead are located directly opposite each other in a mirrored configuration about the longitudinal axis of the frame 12. The left-hand rotor 20L comprises a hub 22 mounted to the underside of a gearbox 24 for rotation around a vertical axis in the direction shown by arrows X and Y. Tine arms 26 are mounted to, and extend radially from, the hub 22. Crop engaging tines 28 are attached to the outermost ends of each tine arm 26.

For each rotor 20L, 20R, a rotor running gear includes one or more connected beams 30 carrying ground engaging support wheels 32 mounted to the underside of the rotor to provide support when travelling across the field during operation. Between each hub 22 and respective support wheels 32, an electrically or hydraulically actuated mechanism is arranged to extend the running gear away from the hub, thereby raising the effective operating height of the rotor 20L, 20R relative to the ground, and to retract the running gear towards the hub, lowering the rotor.

When travelling in a straight forward direction, the downwards force of each rotor 20L, 20R on each support wheel 32 is more or less equal and the rotors 20L, 20R work evenly to bring the crop into a neat swath on the ground which extends parallel to the longitudinal axis of the tractor. However, when turning, for example, when making a headland turn at the end of the field to turn the rake 10 through 180°, the support wheels 32 of the rotor on the inside of the bend of the turn, that is the inner rotor, moves slower compared to the support wheels of the rotor on the outside of the bend (the outer rotor). As a result, the inner rotor experiences an increased downwards force moving the inner rotor and its respective tines closer to the ground. At the same time, the support wheels 32 of the outer rotor experiences a reduced downwards force causing the outer rotor and respective tines to lift away from the ground. The result is that whilst travelling around a bend, not all the crop moved by the tines 28 of the two rotors is pulled into a neat swath, but scattered elsewhere.

For the avoidance of doubt, the terms bend and curve when used herein are interchangeable when describing the motion of a turn of direction of the agricultural tool.

In accordance with the invention, the rake 10 comprises a control system (not shown) which detects when the rake is travelling around a bend and which rotor 20L, or 20R is moving on the outside of the bend and which is moving on the inside of the bend and automatically lifts the inner rotor to compensate for any increased downwards movement. In addition, the outer rotor may automatically lowered to compensate for any lift experienced. By keeping both rotors 20L, 20R at an equal height whilst moving around a bend, a neat swathe is ensured. The frame 12 may be provided with a sensor 12c which detects when the rake 10 is travelling around a bend which feeds into a control unit (not shown) of the rake control system. The sensor may comprise a GPS. The rotors may each be provided with position sensors which send signals to the control unit so that the unit can detect which rotor is an inner rotor and which rotor is an outer rotor.

Alternatively and/or additionally, the rake control system may be connected to the towing tractor's control system, by for example, ISOBUS connections. Information from the tractor's control system, or tractor control unit can be used to determine whether the rake 10 is moving around a bend and identify the inner and outer rotors respectively.

The rake control system will raise the inner rotor by raising respective arm 12a, and/or by adjusting the height adjustment mechanism between the rotor and support wheel. If necessary, the rake control system will lower the outside rotor by lowering a respective arm 12a, and/or by adjusting the height adjustment mechanism between the rotor and support wheel. In this way, the rotors are kept even whilst travelling around a bend.

FIG. 1 shows a twin rotor rake, however, the invention is also applicable to rakes having more than two rotors provided that there is a rotor attached to each opposing side of frame 12.

Figure 2:
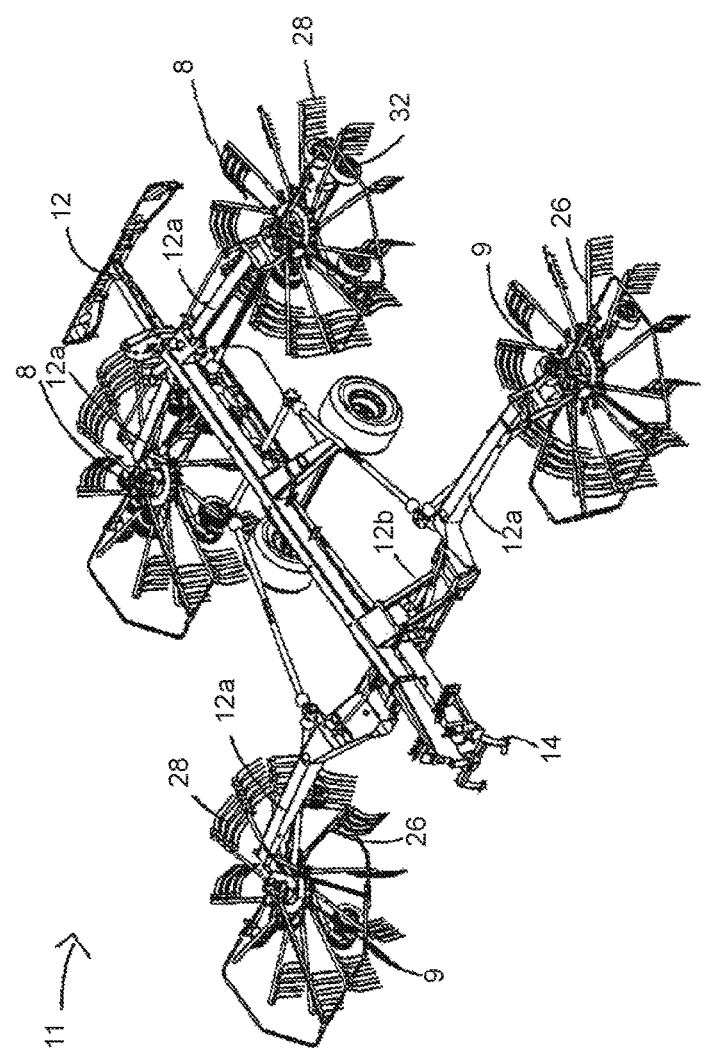
FIG. 2 shows a four rotor rake in accordance with invention.

FIG. 2 is a perspective view of a four rotor rake 11. The same reference numerals used in FIG. 1 have been used to reference the corresponding features in FIG. 2. A four rotor rake 11 has two front rotors 9 attached opposite each other to opposing sides of the frame 12 by respective arms 12a. Two rear rotors 8 are also attached opposite each other to opposing sides of the frame 12 by respective arms 12a. The arms 12a of the rear rotors 8 are shorter than the arms supporting the front rotors 9 so that the rear rotors 8 are carried closer to the frame 12 than the front rotors 9.

The front rotors 9 may be connected to the rake control system such that they move in accordance with the invention whilst the two rear rotors 8 remain unmoved. Alternatively, all four rotors maybe connected to the rake control system such that two inner rotors (a rear rotor 8 and a front rotor 9) are lifted during a turn and two outer rotors (a rear rotor 8 and a front rotor 9) are lowered during the turn.

FIGS. 1 and 2 show rakes in which the rotors are mechanically driven from a PTO of a towing tractor via a drive train, however the invention is equally applicable to rakes and tedders having electrically driven rotors. Moreover, the invention is applicable to agricultural tools in which the rotor height adjustment means is adjusted electrically, for example, via a time signal.

The invention ensures a crop is evenly worked when an agricultural tool moves around a bend which increases the efficiency with which the crop is further worked and/or maximizes the yield from the crop.

The invention claimed is:

1. An agricultural tool comprising:

an elongated frame;

ground engaging wheels for supporting the frame on the ground; and at least two rotors carried by a respective arm, each respective arm moveable into a working position in which the rotors are carried on opposing sides of the frame at a distance away from the frame, each of said rotors comprising a hub provided with tines and each of said hubs supported above the ground by at least one support wheel, wherein the tool further comprises a control system which detects when the tool is moving around a bend in a turning movement and identifies which of the rotors is an inner rotor moving on the inside of the bend and raises the inner rotor to compensate for the downward force exerted on the inner rotor during the turning movement.

2. The agricultural tool as claimed in claim 1 wherein the control system identifies an outer rotor when the tool is turning around the bend and in response lowers the outer rotor.

3. The agricultural tool as claimed in claim 1, wherein a height adjustment mechanism between each of said hubs and the associated at least one support wheel varies the height of the rotor associated with each of said hubs with respect to the wheels.

4. The agricultural tool as claimed in claim 1, wherein movement of each respective arm varies the height of the rotor carried by said arm with respect to the ground.

5. The agricultural tool as claimed in claim 1, wherein the tool comprises a sensor which detects when the tool is turning.

6. The agricultural tool as claimed in claim 5, wherein the sensor comprises a Global Positioning System.

7. The agricultural tool as claimed in claim 1, which is towed by a tractor and said control system receives a signal from the towing tractor that a turn is being made.

8. The agricultural tool as claimed in claim 1, wherein the agricultural tool comprises a rake or a tedder.

* * * * *